(12) United States Patent
Moeglein et al.

(10) Patent No.: US 7,256,733 B2
(45) Date of Patent: Aug. 14, 2007

(54) METHOD AND SYSTEM FOR POSITIONING SIGNAL ACQUISITION ASSISTANCE WINDOW EVALUATION

(75) Inventors: Mark Leo Moeglein, Ashland, OR (US); Wyatt Thomas Riley, King of Prussia, PA (US)

(73) Assignee: QUALCOMM Incorporated, San Diego, CA (US)

( * ) Notice: Subject to any disclaimer, the term of this patent is extended or adjusted under 35 U.S.C. 154(b) by 435 days.

(21) Appl. No.: 11/000,689

(22) Filed: Nov. 30, 2004

(65) Prior Publication Data

US 2006/0103575 A1 May 18, 2006

Related U.S. Application Data

(60) Provisional application No. 60/621,388, filed on Oct. 21, 2004.

(51) Int. Cl.
 *G01S 1/00* (2006.01)
(52) U.S. Cl. .............................. 342/357.15; 342/357.09
(58) Field of Classification Search ........... 342/357.06, 342/357.09, 357.15
 See application file for complete search history.

(56) References Cited

U.S. PATENT DOCUMENTS

| 2002/0082774 A1 | 6/2002 | Bloebaum ................... 701/213 |
| 2002/0123352 A1 | 9/2002 | Vayanos et al. ............ 455/456 |
| 2003/0236621 A1 | 12/2003 | Sirola et al. ................ 701/214 |

FOREIGN PATENT DOCUMENTS

| EP | 1152255 | 4/2001 |
| EP | 1450179 | 8/2004 |

*Primary Examiner*—Thomas H. Tarcza
*Assistant Examiner*—Fred H. Mull
(74) *Attorney, Agent, or Firm*—Thomas Rouse; Bruce W. Greenhaus; Andrea L. Mays

(57) ABSTRACT

A system and method examines the quality of a positioning signal acquisition assistance window of an assisted position location system. The fit of acquisition assistance windows is examined using a posteriori knowledge of specific, or hypothetical, position measurements from a mobile station. A base station almanac manager compares mobile station measurement data to acquisition assistance window data, records an outcome based upon the comparison including a window quality value ($W_Q$), or range of window quality values. Source data used in the generation of acquisition assistance windows is adjusted according to the window quality value.

31 Claims, 4 Drawing Sheets

METHOD AND SYSTEM FOR POSITIONING SIGNAL ACQUISITION ASSISTANCE WINDOW EVALUATION

RELATED APPLICATIONS

This application claims priority to U.S. Provisional Ser. No. 60/621,388, filed on Oct. 21, 2004.

BACKGROUND

1. Field

The disclosed method and apparatus relates to wireless communications, and more specifically to wireless systems that employ signal acquisition assistance window data to assist a receiver in acquiring selected signals.

2. Related Art

The communications field requires accurate position information in many instances for mobile stations (MSs) such as cellular telephones, personal communication system (PCS) devices, and other user equipment (UE). Global Positioning Systems (GPS) offer an approach to providing wireless MS position determination. These systems employ satellite vehicles (SVs) in orbit around the earth. A GPS user can derive precise navigation information including three-dimensional position, velocity and time of day through information gained from the SVs.

Position measurements using GPS are based on measurements of propagation delay times of GPS signals broadcast from the orbiting SVs to a GPS receiver. The precise capabilities of the GPS system are maintained using on-board atomic clocks for each satellite, in conjunction with tracking stations that continuously monitor and correct satellite clock and orbit parameters.

Each GPS SV transmits two direct-sequence-coded spread spectrum signals in the L-band. Unique pseudo-noise (PN) codes of 1023 bits, or "chips", per code period for each SV transmitted every 1 millisecond allow the GPS receiver to distinguish which satellite transmits a given code. A 50-bit/sec data stream containing system status information and satellite orbit parameters, useful for the navigation calculations, are also modulated onto each carrier.

The GPS receiver removes the spreading effect of the PN code modulation from each signal by multiplying it by a time-aligned, locally generated copy of the code. This is referred to as despreading. Because the appropriate time alignment, or "code phase," (effectively, the SV signal time of arrival) is unlikely to be known at receiver start-up, it must be determined by searching during the initial "acquisition" phase of GPS receiver operation.

After despreading is performed, each signal consists of a 50-bit/sec phase shift keyed (PSK) signal at an intermediate carrier frequency. The exact frequency of this PSK signal is uncertain due to the Doppler effect caused by relative movement between the satellite and the MS, and due to local receiver GPS clock reference errors. A search for the Doppler frequency must be performed during initial signal acquisition, because it is usually unknown prior to signal acquisition. A search for code phase offset also occurs within the 1023 chip window, similar to the search for Doppler frequency.

A bit synchronization loop derives data bit timing, and the data stream is finally detected. A position calculation may be undertaken once the signals from at least four satellites have been acquired and locked onto, the code phase measurements have been made, and a sufficient number of data bits (enough to determine the GPS timing reference and orbit parameters) are received. A velocity calculation may be undertaken if a sufficient number of Doppler measurements are also available.

Signal acquisition suffers the disadvantage of requiring a great deal of time and/or hardware resources. The GPS receiver must search across all satellite PN sequences, all code phase hypotheses, and all Doppler frequency offsets in order to locate SV signals. This means searching over up to 32 SVs, 1023 code hypotheses, and 10 kHz of frequency offset. Examined sequentially, signal acquisition can take several minutes. One method of reducing the signal acquisition time is to use parallel signal acquisition hardware, at higher costs, size and power consumption.

In order to reduce signal acquisition delay, information may be provided to aid a receiver in acquiring an SV signal. Such acquisition assistance (AA) information permits a receiver to narrow the space that must be searched in order to locate a signal. This AA data generally consists of expected Doppler information and expected code phase information. Doppler values change with potential MS motion, so while expected Doppler values for each SV can be determined quite precisely for a given location, Doppler uncertainty windows are generally set by assumptions about the range of potential MS motion and rely relatively little upon knowledge of MS position. Expected code phase information generally consists of an expected code phase for each SV and a code phase window of fixed size, where the MS is expected to search.

Systems in which receivers locate ranging signals for position location upon demand, such as SV GPS signals, with the assistance of information provided from another source within the system, are generally referred to as "wireless assisted position location" systems. One example of a wireless assisted position location system is an MS with a GPS receiver, communicating with one or more base stations (BSs) in communication with a core communication network. The MS also communicates with a position determination module (PDM) that provides signal AA data to the MS.

Even with AA data code phase and Doppler windows, the MS may not always acquire the SV signal. This may occur because the SV signal was too weak or corrupted due to noise. It is also possible that an AA data window provided by a PDM was incorrectly located in time (code phase) and/or frequency. For example, the code phase window provided by a PDM may have instructed the MS to search for the SV signal in an incorrect portion of the entire 1023 chip code. The AA data window may have been too small thereby preventing the MS from searching at the correct time and/or frequency. Alternatively, the AA data window may have been too large thereby requiring a large amount of search time. In that instance the allotted time allowed to the MS for searching could expire before acquiring the SV signal.

Typical wireless assisted position location systems do not monitor the quality of AA data at the measurement level, but instead look at the overall wireless system performance in solution space. A need exists for a system and method that monitors AA data quality, in particular the fit of acquisition assistance windows provided by a PDM to an MS.

SUMMARY

The system and method described herein evaluates positioning signal acquisition assistance window quality for an assisted position location system. In one method mobile station position measurement data is provided then compared to an acquisition assistance window. The position measurement data is either actual measurement data from a mobile station, or hypothetical measurement data. Position measurement data provided by the mobile station includes ranging measurement data, timing data, Dopper frequency, and/or global positioning system measurement data. When comparing position measurement data to an acquisition assistance window, transmitter propagation is accounted for between the time an acquisition assistance window was transmitted to a mobile station and the time that a mobile station measurement was determined.

The comparison between position measurement data and an acquisition assistance window includes determining whether the measurement falls within or outside of the window, and a window quality value is assigned to the window based upon the comparison. Advantageously, these outcomes are recorded for use in adjusting the source data used in generating the window.

The comparisons between mobile station position measurement data and acquisition assistance windows can be performed on a measurement-by-measurement basis, on a sector or group of sectors, on a communication system basis, or any geographic region basis. Evaluations of window quality and adjustments to source data used in generating windows can similarly be performed measurement-by-measurement, on a sector or group of sectors, on a communication system, or any geographic region.

When hypothetical measurements are compared to acquisition assistance windows, uncertainty associated with the hypothesis is taken into account. Accordingly, a range of window quality values is generated due to the uncertainty. The range of window quality values and other outcomes from the comparison are recorded and source data used in generating acquisition assistance windows is adjusted accordingly.

Another method includes comparing actual mobile station position measurement data to an acquisition assistance window and comparing hypothetical mobile station position measurement data to an acquisition assistance window. Window quality values are determined based on each comparison. Large differences between the two window quality values indicate ranging error.

The system described herein includes a transmitter, a mobile station receiver, a position determination module having an almanac of transmitter information used in the generation of transmitter signal acquisition assistance data, and a computer for managing and updating the position determination module almanac according to a posteriori knowledge of mobile station measurements and position information. The computer records acquisition assistance window quality values based upon comparisons of mobile station position measurement data to acquisition assistance windows, as well as mobile station receiver successful and failed transmitter signal acquisitions within and outside of acquisition assistance windows.

Another method described herein includes evaluating acquisition assistance window quality for an assisted position location system having positioning signal transmitters and a mobile station positioning signal receiver, by comparing a posteriori mobile station position measurement data to a positioning signal acquisition assistance window, and recording an outcome based upon the comparison. Recording an outcome based upon the comparison includes recording the success or failure of transmitter signal acquisition by the mobile station receiver within or outside the acquisition assistance window, and/or generating an acquisition assistance window quality value based upon the comparison. Source data used in generating acquisition assistance windows is adjusted based upon the comparison.

DRAWINGS

Embodiments of the disclosed method and apparatus are shown in the following figures, in which like reference numbers and designations indicate like or similar parts.

Figure 3:
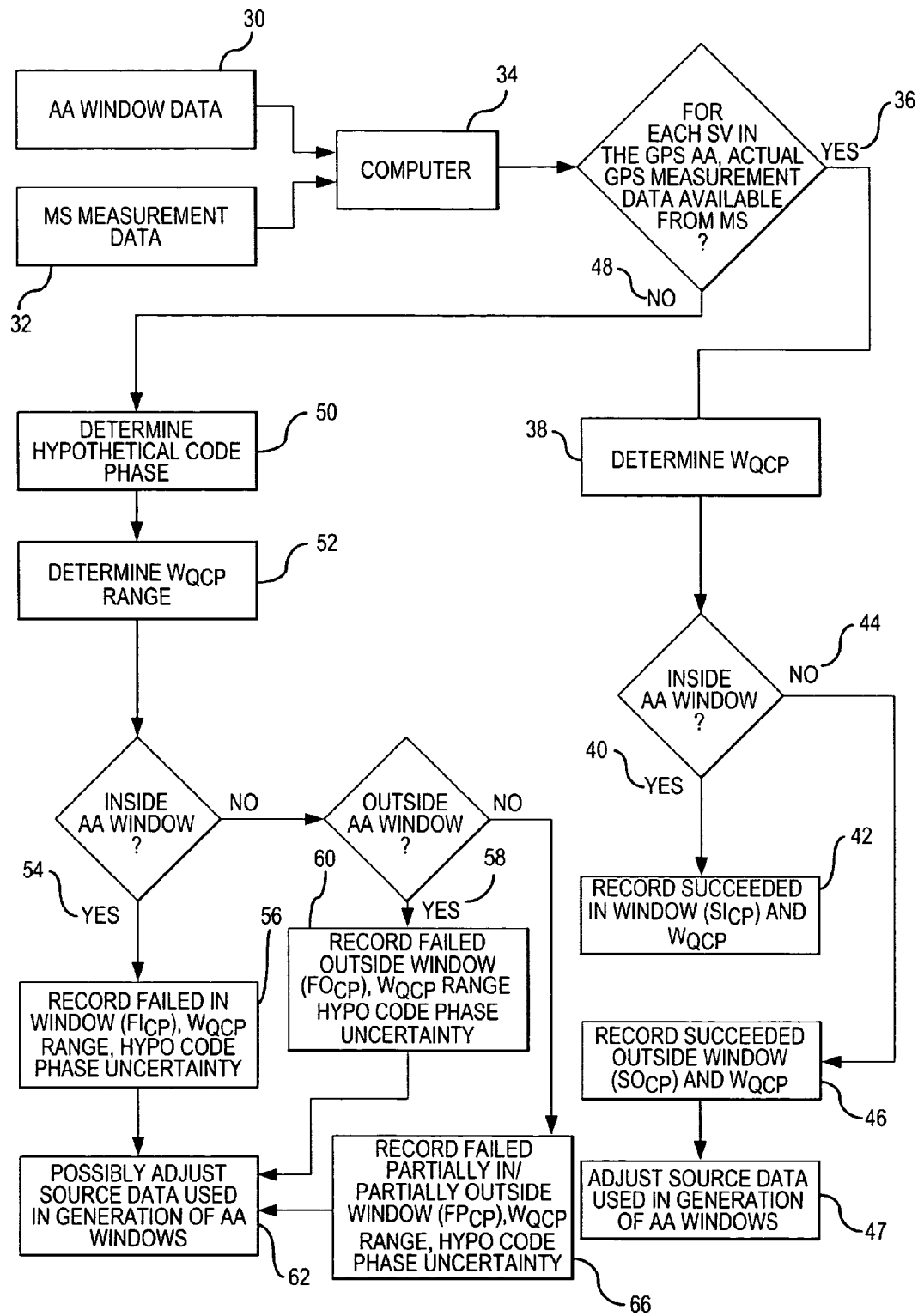
Figure 4:
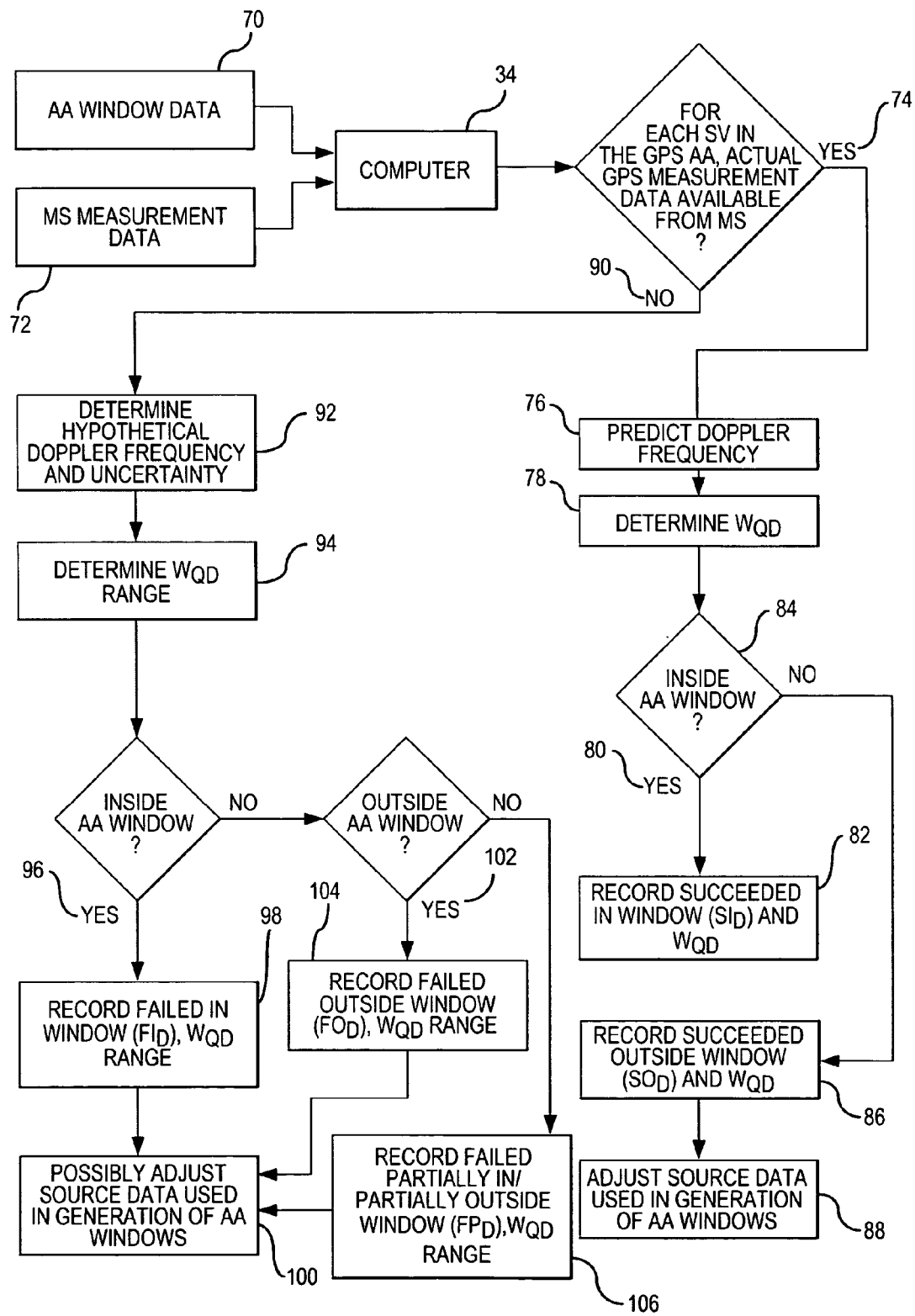
Figure 5:
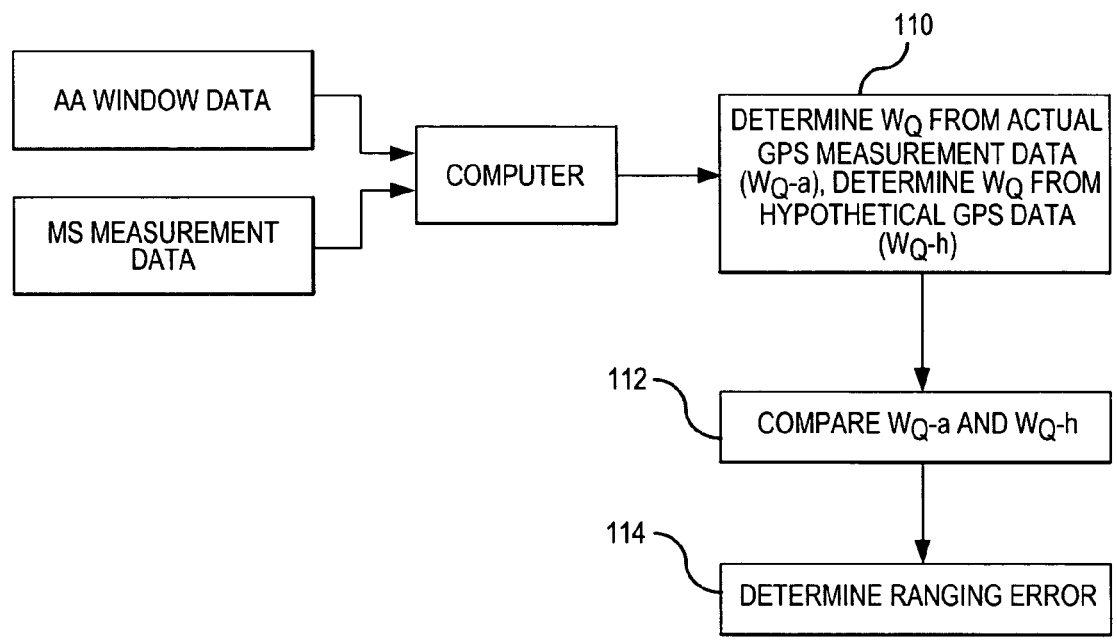

FIG. 3 outlines a comparison of actual or hypothesized position measurement data to acquisition assistance window data to determine a code phase acquisition assistance window quality value ($W_{QCP}$);

FIG. 4 outlines a comparison of actual or hypothesized position measurement data to acquisition assistance window data to determine a Doppler frequency acquisition assistance window quality value ($W_{QD}$); and FIG. 5 outlines a comparison of a window quality value ($W_{Q-a}$) determined from actual position measurement data to a window quality value ($W_{Q-h}$) determined from hypothetical data.

DETAILED DESCRIPTION

The method and system described herein is applicable for systems, such as wireless assisted position location systems, that utilize acquisition assistance data to aid a receiver in acquiring a signal. Most wireless assisted position location systems are able to acquire and utilize global positioning system (GPS) satellite vehicle (SV) signals. However, it will be understood by those of skill in the art that the method and system described herein is applicable to any position location system that utilizes acquisition assistance information. It will be understood by those skilled in the art that any communication air interface may be used as well. Signals that need to be acquired for ranging or timing purposes are not limited to CDMA or GSM signals, but may include other types.

Ranging signals are also not limited to GPS SV signals. For example, base station (BS) signals are commonly used for ranging, and the ranging signals need not be communication signals. Signals can also be transmitted from other satellite ranging systems, such as Glonass and Galileo satellite navigation systems. Any transmitter may be treated similarly as SVs are treated herein, with acquisition assistance information deduced, obtained and employed to aid in the acquisition of a signal from such transmitter.

For both signal acquisition and ranging purposes, information related to the timing of selected communication signals is useful. It is useful to ascertain when to expect the arrival of a recognizable feature of a given signal so that a search for the signal need only cover a limited time duration, and it is also useful to determine, as exactly as possible, the time of arrival of various signals with respect to each other. This latter information can be used for ranging purposes. Both of these timing issues involve "time of arrival" of a recognizable feature of a signal.

Persons skilled in regard to communication systems will understand that such time of arrival information is in most ways equivalent to a "code phase" of the signal. The "code phase" describes the timing of the arrived signal in terms of the phase offset between the received code and the same code beginning at a reference time. Thus, identifying the "code phase" of a signal effectively identifies the "time of arrival" of the signal, requiring only multiplication of the code phase by the frequency of the signal to obtain a time of arrival. These two are so closely and simply related that "time of arrival" is nearly interchangeable with "code phase." "Time of arrival" terminology is often used in position location systems, particularly in systems that do not share the "code" aspects of communication systems.

Persons skilled in the art will also recognize that a "pseudorange", or distance to a satellite or other transmitter, can be derived from the code phase, or code phase derived from pseudorange, given the appropriate clock and position information. Thus, "pseudorange" and "code phase" are often used interchangeably as well. Methods for determining code phase, pseudorange, time of arrival and Doppler frequency are well known to those of skill in the art. The method and system described herein is not to be limited to any particular method for determining these values.

Further, the term "computer" is used herein to refer generally to a programmable apparatus or terminal in communication with a programmable apparatus, programmable wireless handheld device such as a mobile station, or server such as a PDM, having a processor or other equivalent hardware, as well known by those skilled in the art. Each "computer," "handheld device" or "server" referred to herein includes the necessary "computer-readable" media to perform the functions described herein, or is in communication with the necessary computer-readable media. The term "computer-readable medium" refers to any medium that participates in providing instructions to a processor for execution. As used herein, the term "computer instructions" refers to a set of instructions that can be communicated to a processor.

"Computer readable media" may take many forms, including but not limited to, "non-volatile media", "volatile media", and "transmission media". "Non-volatile media" includes, for example, optical or magnetic disks such as used for a storage medium. "Volatile media" includes dynamic memory. Common forms of "computer-readable media" include floppy disks, flexible disks, hard disks, magnetic tape, other magnetic mediums, CD-ROM or other optical medium, RAM, PROM, EPROM, FLASH EPROM, and other memory chips or cartridges, a carrier wave, or any medium from which a computer or processor, as those terms are known to those skilled in the art, can read. Databases, data, and/or records can be recorded or stored on computer readable media. The term "data" as used herein refers to information. For example, measurement "data" refers to any information associated with, derived from, or related to the measurement.

In describing the method and system and associated background herein, the following notations may be used:
R is the radius of the MS location uncertainty region
$b_{SV}$ is the SV clock bias
$b_{MS}$ is the MS clock bias
$\hat{b}_{MS}$ is the estimated MS clock bias
$\tilde{b}_{MS}$ is the MS clock bias uncertainty
$\Delta \hat{f}_{MS}$ is the estimated MS frequency offset
$\Delta \tilde{f}_{MS}$ is the uncertainty in the estimated MS frequency offset
$f_{SV}$ is the SV Doppler
$\alpha$ is the SV elevation angle
c is the speed of light
$f_c$ is the chip rate (1.023 MHz for GPS C/A code)
$\vec{r}_{BS\_SV}$ is the vector pointing from the BS to the SV
$\vec{r}_{MS\_SV}$ is the vector pointing from the MS to the SV In typical wireless assisted position location systems, for example assisted GPS (AGPS) systems, AA data for satellite GPS signals are provided to the mobile station by a PDM. Information used to create the AA data is stored in a local real-time database, often referred to as a "base station almanac" (BSA), in the PDM, which provides the AA data to the MS based upon the serving cell identification and other information provided by the MS. A base station almanac manager maintains and updates the BSA for all PDMs of a given communication network.

Various AA information may be communicated to the MS to aid the GPS receiver in acquiring the SV signal, including code phase and Doppler frequency windows. This information informs the MS where in time and frequency to "search" for the SV signals, and also which signals to search for. Procedures for providing AA data from the PDM to the MS are defined in the various position location signaling standards and are not discussed here.

Typically AA data is derived from the PDM's best understanding of where the MS is currently located and the MS clock state at that time. One way in which the PDM determines a location estimate for the MS is through network-based range measurements. Network-based range measurements, also known as pilot phase measurements (PPMs), or advanced forward link tralateration (AFLT) measurements in IS-95 and IS-2000 communication networks, are ranging measurements to a cell tower antenna. Pilot phase measurements can be useful in determining a reasonably accurate position and clock state for the MS. Once this state is known, the PDM can reduce signal acquisition search window sizes dramatically, thus saving search time and providing a more accurate solution. If a set of PPMs is not sufficient to generate a navigation solution for the MS, the AA data is typically based upon coverage area information for the known sectors in which the PDM is located. Based upon this information, AA data including a predicted code phase, associated code phase window, predicted Doppler frequency, and associated Doppler frequency window, is provided by the PDM to an MS.

Figure 1:
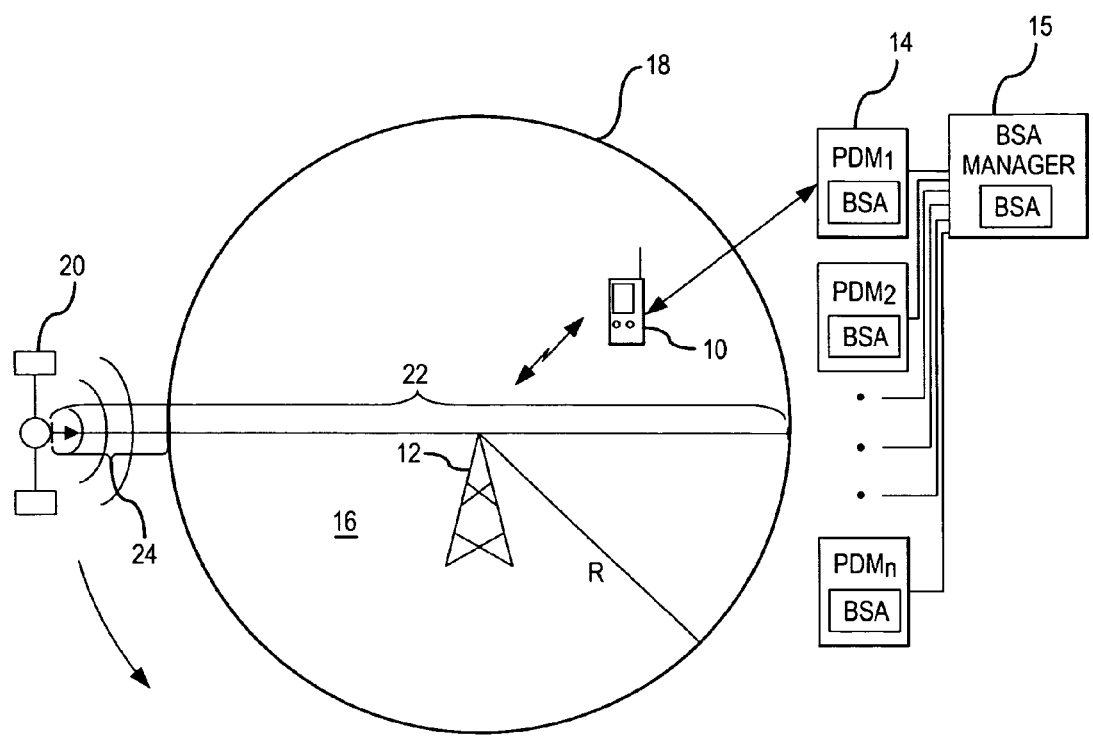
FIG. 1 illustrates a simplified diagram for determining position uncertainty area of a mobile station in communication with a serving base station and satellite vehicle.

Referring to FIG. 1, a simplified diagram illustrates an example of a wireless assisted position location system. MS 10 is located in the coverage area of a serving BS, or base transmitting station (BTS), 12 and communicates with the BS 12. BS 12 communicates with the PDM 14 of a core communication network, which stores a local copy of a BSA managed and updated by BSA manager 15 in communication with the PDM 14. Both PDM 14 and BSA manager 15 are computers or servers. MS 10 includes the appropriate hardware for two-way communication, such as but not limited to a UMTS, CDMA, or GSM modem; a position location system, such as but not limited to a GPS receiver and GPS clock; and programmable control such as but not limited to a central processor, computer readable media, and suitable computer instructions.

An appropriate first estimation of the coverage area of the BS 12 is the area 16 within a circle 18 centered at the BS antenna, given the serving antenna operates directly from the serving base station 12, such as when there is no repeater in the communication path. The uncertainty area for the location of the MS 10 coincides with this coverage area 16. The predicted code phase for a signal communicated between the antenna of an SV 20 and the antenna of MS 10 can be geometrically calculated by techniques known to those of skill in the art.

For example, maximum code phase 22 corresponds to the distance from the SV 20 to a farthest point of serving cell 16, while minimum code phase 24 corresponds to the distance from the SV 14 to a closest point of serving cell 16. The difference between the maximum and minimum code phase could be the code phase window provided by the PDM 14 to the MS 10. Thus, the size of the code phase AA window, or code phase prediction uncertainty, corresponds to the diameter of the coverage area 16 of the serving antenna of BS 12 of FIG. 1a, taking into account the angle of elevation to the SV 20. The predicted code phase lies at the center of this code phase window. Similarly, the size of the Doppler window corresponds to the coverage area 16 of the serving antenna because the Doppler frequency for a static MS varies at different points in the coverage area. The Doppler window size that the MS uses is based upon the relative movements of the MS 10 and SV 14, and the portion of the window size due to MS motion alone, is often the larger component.

In a CDMA system, for example, the MS observes code phase P, which can generally be expressed as $$P = f_c \cdot \left( \frac{|\vec{r}_{MS\_SV}|}{c} + b_{SV} - b_{Ms} \right). \quad (1)$$

The predicted code phase, $\hat{P}$, can be expressed as $$\hat{P} = f_c \cdot \left( \frac{|\vec{r}_{BS\_SV}|}{c} + b_{SV} - \hat{b}_{Ms} \right), \quad (2)$$

and the window size, W, can be expressed as $$W = f_c \cdot \left( \frac{2 \cdot R \cdot \cos\alpha}{c} + \tilde{b}_{MS} \right). \quad (3)$$

A value representing a code phase window W is transmitted from a PDM 14 to the MS 10, representing the total search window size, in the standard message format for the communication network protocol. It will be understood by those of skill in the art that predicted code phase, $\hat{P}$ and window size, W, may be determined or calculated by other methods or formulas. These parameters are not limited to calculation via the example and formulas set forth above. U.S. patent application Ser. No. 09/910,361, entitled "GPS Satellite Signal Acquisition Assistance System and Method in a Wireless Communication Network," filed Jul. 20, 2001 provides further description and background regarding satellite signal acquisition assistance and is incorporated herein by reference.

The AA Doppler search window provided to the MS 10 by the PDM 14 narrows the search for the Doppler frequency offset of an SV signal. The predicted Doppler, $\hat{D}$, can be derived as $$\hat{D} = f_{SV} - \Delta f_{MS}, \quad (4)$$

and the Doppler search window, $W_D$, can be calculated as $$W_D = R \cdot q_1 + \Delta f_{MS}, \quad (5)$$

where $q_1$ is a factor accounting for the location uncertainty. Typically, $q_1 = 10^{-3}$ Hz/m is used. It will be understood by those of skill in the art that predicted Doppler, and window size, $W_D$, may be determined or calculated by other methods or formulas. These parameters are not limited to calculation via the formulas set forth above. See also, U.S. patent application Ser. No. 09/910,361, entitled "GPS Satellite Signal Acquisition Assistance System and Method in a Wireless Communication Network," filed Jul. 20, 2001.

As stated, typical assisted position location systems do not monitor the quality of AA data provided to the MS. AA data windows may be misplaced, too small, or too large to provide meaningful or efficient SV signal acquisition assistance. The method and system for GPS AA window evaluation described herein examines the fit of AA windows using a posteriori knowledge of specific, or hypothetical, measurements and position information. Information gained from this evaluation aids in BSA management and improves AA data generation. The BSA manager 15 compares MS measurement data to AA window data, records an outcome based upon the comparison such as the success and failure of signal acquisition whether within or outside the AA data window, uncertainty associated with the outcome, and an AA window quality value ($W_Q$). As used herein, the term "window" refers to any window, be it an AA window or data derived from the window as necessary to perform a comparison between measured or hypothesized data and an AA window. The BSA manager also adjusts the source data used in the generation of AA windows based upon the window quality value.

Figure 2:
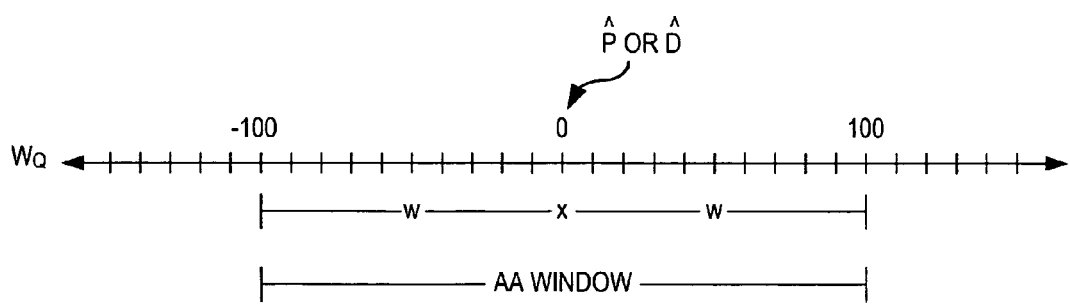
FIG. 2 illustrates a method of assigning an acquisition assistance window quality value ($W_Q$)

FIG. 2 illustrates an example of assigning a window quality value ($W_Q$) to an AA window for code phase or Doppler frequency. An AA window, for example a code phase or Doppler window, having a center or predicted value of x, spans the range x−w to x+w. The center x of the window is designated 0, while the minimum value of the window is designated −100, and the maximum window value is designated 100, with all values between being assigned integers in linear fashion. Values continue above 100, and below −100, in a similar linear fashion.

The relationship between the position measurement data and the AA window determines the accuracy, or quality, of the AA window. If the position measurement data, as determined by the MS or otherwise, falls within the window then: $-100 < W_Q < 100$. If the position measurement data falls outside the window then: $|W_Q| \exists 100$. The greater $|W_Q|$, the poorer the window quality. Assuming the position measurement data and clock state are reliable, then the window quality value can also be deemed reliable. It will be appreciated by those of skill in the art that a multitude of different numbering schemes or other methodologies could be used to assign a quality value ($W_Q$) to an AA window based upon position measurement data. The method of assigning a value to $W_Q$ depicted in FIG. 2 is not to be limited to any particular scheme.

In a first method for evaluating the quality of an AA window, an actual GPS code phase, or pseudorange, is available to the MS through SV signal acquisition. In this instance a comparison is made between the actual, known code phase and the AA code phase window that was previously provided to the MS, and a window quality value ($W_Q$) is generated to represent the comparison. (See FIG. 3.)

In a second method for evaluating the quality of an AA data window, an actual GPS code phase, or pseudorange, is not available to the MS. In this instance a hypothetical GPS code phase is determined and compared to the AA code phase window provided to the MS, and a window quality value ($W_Q$) is generated to represent the comparison. (See also FIG. 3.) In either the first or second methods, a Doppler frequency window quality value is also generated. (See FIG. 4.) Ranging error can be detected through a hybrid method where both actual GPS measurement data and hypothetical GPS data are considered, either by comparison to each other or through comparison to the AA window. (See FIG. 5.)

Referring to FIG. 3, a diagram outlines methods of evaluating code phase AA window data quality. Acquisition assistance window data 30, such as GPS code phase, pseudorange, or time of arrival window data, along with actual position measurement data 32 provided by the MS are input to a computer 34 to compare the two. Measurement data provided by the MS 32 includes ground-based ranging measurements such as AFLT or PPM data, GPS measurements such as code phase, pseudorange, or time of arrival, Doppler frequency data, or any combination thereof. As used herein the term "measurement data" includes data provided by the MS, as well as data derived from data provided by the MS. Measurement data may be actual, predicted, or hypothesized. For example, code phase may be determined by computer from a pseudorange, or time of arrival, provided by the MS. The computer 34 performing the comparison is any suitable computer or server such as a BSA manager 15 (see FIG. 1), a PDM, or other computer.

If actual GPS measurement data for each SV is available from the MS 36—because AA window data and MS measurement data are generally sent relevant to a group of SVs—a code phase window quality value ($W_{QCP}$) 38 is determined by comparing the measurement data to the AA code phase window. (See e.g., FIG. 2.) If the actual measurement value falls within the window, then the window is assigned a window quality value ($W_{QCP}$) somewhere between −100 and +100 according to the relationship between the measured value and the predicted value. If the actual measurement value falls outside the window, then the window is assigned a window quality value ($W_{QCP}$) somewhere below −100 or above +100 according to the relationship between the measured value and the predicted value.

SV propagation is taken into account when comparing measured, or actual, GPS code phase to an AA code phase window to determine $W_{QCP}$. For example, at time $t_1$ acquisition assistance may instruct the MS to search within a particular code phase window defined as, $$W = x +/- w, \quad (6)$$

having a Doppler of dx/dt, which is the rate of change of x because movement of the SV causes the code phase to change over time. Therefore, the system must account for propagation of the SV between time $t_1$ and $t_2$, where $t_2$ is the time at which the MS actually measures the code phase, y. In order to compare the MS measured code phase y, at time $t_2$, to the AA code phase window sent to the MS at time $t_1$, the system compares the measured code phase y, at time $t_2$, to a propagated AA code phase window ($W_p$), where:

$$W_p = x_p +/- w, \quad (7)$$

$$\text{where } x_p = x + dx/dt(t_2 - t_1). \quad (8)$$

Comparison of MS measured code phase y to the propagated AA code phase window $W_p$ takes into account SV propagation that occurred between the time that the AA code phase window was transmitted to the MS and the time that the MS measured the received code phase. This comparison is used to determine the window quality value ($W_{QCP}$) 38.

If the actual code phase falls within the AA code phase window 40, then a "succeeded in window" ($SI_{CP}$) record is made along with the $W_{QCP}$ value 42. This would indicate that the AA code phase window is accurate enough and no adjustments need to be made to the source data used in the generation of AA code phase windows.

If the actual code phase falls outside the AA code phase window 44, then a "succeeded outside window" ($SO_{CP}$) record is made along with the $W_{QCP}$ value 46. This would indicate that the MS searched for the SV signal outside of the AA code phase window, but nonetheless acquired the signal. If so, the AA window could have been either too small or in an incorrect location. For example, an AA code phase window could have been located in the wrong portion of the chip code. When this occurs the AA window should be evaluated for accuracy and the source data used in the generation of AA windows modified as necessary 47. Recordation of the $SI_{CP}$, $SO_{CP}$, and $W_{QCP}$ values is made onto suitable computer readable media.

There may be instances where actual GPS measurement data for a particular satellite is not available 48, such as, but not limited to, the case where few satellite signals are detected by the MS. In that case the system determines a hypothetical code phase for that particular satellite 50. For example, although eight or more satellites may be above the horizon and thereby potentially available to an MS, the MS might acquire signals from just four satellites. MS position can be calculated based upon the signals received from the four available satellites using matrix algebra, and then a hypothetical pseudorange, and corresponding code phase, to each of the other four satellites can be determined based upon the MS position determination, MS clock bias, and known SV locations and known SV clock biases.

In another instance when GPS data may not be available to the MS, the true position for the MS may be obtained through an alternate source, such as for example, through a survey or map. In that case, MS position may be known even more accurately than possible solely from GPS measurements that were actually obtained from one or more SVs. Such a truth position, together with at least one GPS or network ranging measurement, needed for an MS clock bias estimate, can then be used to hypothesize the pseudorange, and associated code phase of all the GPS SV signals that were not detected.

Ground-based ranging measurements, such as AFLT or PPM, also provide an MS position. A final position fix for the MS can be determined through ground-based ranging measurements, BTS coverage area information, GPS measurements, or a combination thereof. Once a final MS position is determined and MS clock bias is known, it is possible to hypothesize the pseudorange and associated code phase to a selected SV.

Uncertainty due to final MS position error or MS clock bias or both, is accounted for when hypothesizing a pseudorange, and code phase, to an SV. For example, there could be a 100-meter error, or more, in the position or clock bias. In this case the hypothesized pseudorange is inaccurate by a similar quantity. Uncertainty in the hypothesized code phase obscures the comparison to the AA code phase window creating a range of window quality values. The hypothesized code phase uncertainty is calculated from the a posteriori covariance matrix of the position fix, projected in the direction of the SV of interest. The a posteriori covariance matrix can be determined by scaling the a priori covariance by the unit variance. Both metrics are well known to those skilled in the art of GPS navigation.

A range of $W_{QCP}$ values 52 is determined by comparing the hypothetical code phase to the AA code phase window taking into account the uncertainty of the hypothetical code phase due to position or clock bias error. SV propagation that occurred between the time that the AA code phase window was transmitted to the MS and the time that the hypothetical code phase was determined is also taken into account.

If the hypothesized code phase range falls inside the AA code phase window 54 then a "failed in window" ($FI_{CP}$) record is made along with the range of $W_{QCP}$ values 56. The uncertainty of the hypothesized code phase due to final position fix error or clock bias, or both, is similarly recorded. A "failed in window" could indicate that the satellite signal was inaccessible due to poor signal strength, excessive noise, poor mobile receiver sensitivity, and/or other factors. Alternatively, failing within the AA code phase window could indicate that the AA code phase window was too large, and the time allotted to the MS to search for the signal within that window expired prior to acquiring the signal, in which case the source data used in the generation of AA windows may require adjustment 62.

When the hypothesized code phase falls outside the AA code phase window 58, a "failed outside window" ($FO_{CP}$) record is made along with the range of $W_{QCP}$ values 60. The uncertainty of the hypothesized code phase due to final position fix error or clock bias, or both, is similarly recorded. A "failed outside window" could indicate that the AA window is too small, or incorrectly located, such that the MS is unable to acquire the signal within the window. In this case the AA window should be evaluated for accuracy and the source data used in the generation of AA windows modified as necessary 62. If the AA window data were based upon the size and location of a specific cell sector, then the coverage area of that sector, which is stored in the BSA, may be questionable. Methods for determining the coverage area radius of a sector are known and are therefore not discussed here. If the AA window data were based upon a previous location fix, then the error estimate, or use of an error estimate, may be questionable as well.

Because of the uncertainty in the hypothesized measurement, the resulting range of window quality values may fall partially within and partially outside ($FP_{CP}$) of the AA code phase window 66. In that case a record is made of the failure along with the range of $W_{QCP}$ values, and the uncertainty of the hypothesized code phase due to final position fix error or clock bias, or both.

Recordation of the $FI_{CP}$, $FO_{CP}$, $FP_{CP}$ and $W_{QCP}$ values is made onto suitable computer readable media. The uncertainty of the hypothesized code phase due to final position fix error or clock bias, or both, is similarly recorded onto suitable computer readable media.

Referring to FIG. 4, a diagram outlines methods of evaluating Doppler frequency AA window data quality. Doppler frequency acquisition assistance window data 70, along with actual position measurement data 72 provided by the MS are input to a computer 34 to compare the two. Measurement data provided by the MS 32 includes ground-based ranging measurements such as AFLT or PPM data, GPS measurements such as code phase, pseudorange, or time of arrival, Doppler frequency data, or any combination thereof.

Doppler frequency can be predicted by accounting for MS velocity, given the respective positions and velocities of the MS and SV of interest as will be understood by those skilled in the art 76. See also Equation (4). The predicted Doppler frequency is compared to the AA Doppler frequency window to determine a Doppler window quality value ($W_{QD}$) 78. (See e.g., FIG. 2.) If the Doppler value falls within the window, then the window is assigned a window quality value ($W_{QD}$) somewhere between −100 and +100. If the Doppler value falls outside the window, then the window is assigned a window quality value ($W_{QD}$) somewhere below −100 or above +100.

If the Doppler falls within the AA Doppler window 80, then a "succeeded in window" ($SI_D$) record is made along with the $W_{QD}$ value 82. This would indicate that the AA Doppler window is accurate enough and no adjustments need to be made to the source data used in the generation of AA windows.

If the Doppler falls outside the AA Doppler window 84, then a "succeeded outside window" ($SO_D$) record is made along with the $W_{QD}$ value 86. This would indicate that the MS searched for the SV signal outside of the AA Doppler window, but nonetheless acquired the signal. If so, the AA Doppler window could have been either too small or in an incorrect location. When this occurs the AA window should be evaluated for accuracy and the source data used in the generation of AA windows modified as necessary 88. Recordation of the $SI_D$, $SO_D$, and $W_{QD}$ values is made onto suitable computer readable media.

In those instances where actual GPS measurement data for a particular satellite is not available 90, a Doppler frequency and associated uncertainty is predicted 92 by accounting for MS velocity, given the respective positions and velocities of the MS and SV of interest as will be understood by those skilled in the art. A comparison of the hypothetical, predicted Doppler frequency and associated uncertainty to the AA Doppler window results in a range of $W_{QD}$ values 94.

If the hypothetical, predicted Doppler range falls inside the AA Doppler window 96 then a "failed in window" ($FI_D$) record is made along with the range of $W_{QD}$ values 98. The uncertainty of the hypothesized code phase due to final position fix error or clock bias, or both, is similarly recorded. A "failed in window" could indicate that the satellite signal was inaccessible due to poor signal strength, excessive noise, poor mobile receiver sensitivity, and/or other factors. Alternatively, failing within the AA window could indicate that the AA Doppler window was too large, and the time allotted to the MS to search for the signal within that window expired prior to acquiring the signal, in which case the source data used in the generation of AA windows may require adjustment 100.

When the hypothetical, predicted Doppler range falls outside the AA Doppler window 102, a "failed outside window" ($FO_D$) record is made along with the range of $W_{QD}$ values 104. The uncertainty of the hypothesized code phase due to final position fix error or clock bias, or both, is similarly recorded. A "failed outside window" could indicate that the AA window is too small, or incorrectly located, such that the MS is unable to acquire the signal within the Doppler window. In this case the AA Doppler window should be evaluated for accuracy and the source data used in the generation of AA windows modified as necessary 100. If the AA window data were based upon the size and location of a specific cell sector, then the coverage area of that sector, which is stored in the BSA, may be questionable. Methods for determining the coverage area radius of a sector are known and are therefore not discussed here. If the AA Doppler window data were based upon a previous location fix, then the error estimate, or use of an error estimate, may be questionable as well.

Because of the uncertainty in the hypothesized code phase, the resulting range of Doppler window quality values may fall partially within and partially outside ($FP_D$) of the AA Doppler window 106. In that case a record is made of the failure along with the range of $W_{QD}$ values, and the uncertainty of the hypothesized code phase due to final position fix error or clock bias, or both. Recordation of the $FI_D$, $FO_D$, $FP_D$ and $W_{QD}$ values, and uncertainty of the hypothesized code phase due to final position fix error or clock bias, or both, is made onto suitable computer readable media.

In a hybrid method for evaluating the quality of AA data windows, the system compares both the actual measurement data—as determined by the MS or otherwise—to the AA window, and hypothetical data, such as code phase or Doppler frequency, to the AA window. FIG. 5 outlines this method. AA window data and MS measurement data are provided to the computer 34. An AA window quality value ($W_{Q-a}$) is determined from actual GPS measurement data, assuming actual data is available from the MS. Additionally, an AA window quality value ($W_{Q-h}$) is determined from hypothetical data, such as from a hypothetical code phase 110, or predicted Doppler frequency. The two window quality values ($W_{Q-a}$) and ($W_{Q-h}$) are compared to determine if they are similar in value 112. This method is useful for cases of large ranging errors where actual and hypothetical code phases greatly diverge. Large differences between the window quality values determined from hypothetical data and actual measurement data indicate ranging error 114. It will be apparent to those skilled in the art that window quality values need not necessarily be calculated to perform the hybrid method depicted in FIG. 5. Actual measurement data can instead be directly compared to hypothetical, or predicted, data to compare the two.

Tracking the failure and success of signal acquisition and window quality values provides valuable information about the quality of AA window data. Window quality can be evaluated on a measurement-by-measurement basis, on a communication system level, geographic region level, or other grouping basis such as by one or more sectors. At the system, region, or other grouping basis level, the overall health of the AA data can be evaluated by checking the proportion of all missed measurements that were likely outside the window versus those inside the window.

Any combination of window quality statistics regarding success and failure is useful in evaluating acquisition assistance and adjusting source data used in the generation of AA windows. For example, a high failure to success ratio would indicate poor GPS acquisition in general. A relatively high ratio of FO/SI would indicate that AA windows were generally inaccurate or too small, while a low FO/SI ratio might indicate that windows were generally too large. Further, if the ratio (FO/FI)/(SO/SI)—which provides insight into whether a measurement outside the AA window is substantially more likely to fail than those inside the window—exceeds a predefined threshold with statistical confidence, then the overall AA health may be questionable.

At the system, region, or other grouping basis level, the overall coverage of AA windows can be monitored and the source data used in the generation of AA windows adjusted accordingly. Adjustments can be made on a sector-by-sector basis, within a local area defined by a certain collection of sectors, over an entire system, or any other region. For example, a sector-specific AA scale factor may be kept, or the "maximum antenna range" (MAR) adjusted in the case of sector-based acquisition assistance. Adjustments to the AA window source data can be made in real time, aperiodically, or periodically in a batch processing mode by the base station almanac manager or other suitable computer or server. Such adjustments can be stored in the BSA used to describe the state of the network.

While AA code phase and Doppler frequency windows were used herein to demonstrate a method and system for evaluating AA window data quality, it will be apparent to those skilled in the art that similar evaluations of AA window quality can be made for other types of AA data, such as but not limited to signal time of arrival and pseudorange.

The foregoing description illustrates exemplary implementations, and novel features, of a method and system for positioning signal acquisition assistance window evaluation. There are many aspects to this method and system, because it may involve interaction between numerous components of a communications system. While some suggestions are provided for alternative uses and implementations of the method and system, it is of course not practical to exhaustively list or describe such alternatives. Accordingly, the scope of the method and system should be determined only by reference to the appended claims, and should not otherwise be limited by features illustrated herein except insofar as such limitation is recited in an appended claim.

While the above description has pointed out novel features of the disclosed method and system, the skilled person will understand that various omissions, substitutions, and changes in the form and details of the methods and systems illustrated may be made without departing from the scope of the invention. For example, the skilled person will be able to adapt the details described herein to communications systems having a wide range of modulation techniques, transmitter and receiver architectures, and generally any number of different formats. Any transmitter may be treated similarly as SVs are treated herein, with acquisition assistance information deduced, obtained and employed to aid in the acquisition of a signal from such transmitter.

Each practical and novel combination of the elements described hereinabove, and each practical combination of equivalents to such elements, is contemplated as an embodiment of the invention. Partly because many more element combinations are contemplated as embodiments of the invention than can reasonably be explicitly enumerated herein, the scope of the invention is properly defined by the appended claims rather than by the foregoing description. Furthermore, any operable possible combination of features described above should be considered as having been expressly and explicitly disclosed herein. All variations coming within the meaning and range of equivalency of the various claim elements are embraced within the scope of the corresponding claim. To this end, each described element in each claim should be construed as broadly as possible, and moreover should be understood to encompass any equivalent to such element insofar as possible without also encompassing the prior art.

The invention claimed is:

1. A method of evaluating acquisition assistance window quality for an assisted position location system, the method comprising:
   providing mobile station position measurement data; and
   comparing mobile station position measurement data to an acquisition assistance window; and
   evaluating acquisition assistance window quality based upon the comparison.

2. The method of claim 1 wherein mobile station position measurement data comprises at least one type of data selected from the group consisting of actual measurement data and hypothetical measurement data.

3. The method of claim 2 wherein hypothetical mobile station position measurement data comprises at least one type of hypothetical data selected from the group consisting of code phase data, psendorange data, time of arrival data, or Doppler frequency data.

4. The method of claim 2 wherein providing mobile station position measurement data comprises providing at least one type of data selected from the group consisting of ground-based ranging measurement data, timing data, Doppler frequency, and global positioning system measurement data.

5. The method of claim 4 wherein said global positioning system measurement data comprises at least one type of data selected from the group consisting of code phase data, pseudorange data, time of arrival data, or Doppler frequency data.

6. The method of claim 2 wherein comparing mobile station position measurement data to an acquisition assistance window further comprises accounting for propagation between the time an acquisition assistance window was transmitted to a mobile station and the time that a mobile station measurement was determined.

7. The method of claim 2 wherein comparing mobile station position measurement data to an acquisition assistance window comprises determining whether the measurement data falls within the acquisition assistance window.

8. The method of claim 2 further comprising determining a window quality value based upon the comparison step.

9. The method of claim 8 wherein determining a window quality value based upon the comparison step comprises assigning a value between a first and second integer value for measurement data within the acquisition assistance window.

10. The method of claim 8 further comprising recording the window quality value.

11. The method of claim 8 wherein comparing mobile station position measurement data to an acquisition assistance window comprises:
    comparing actual mobile station position measurement data to an acquisition assistance window; and
    comparing hypothetical mobile station position measurement data to an acquisition assistance window.

12. The method of claim 11 wherein determining a window quality value based upon the comparison step comprises determining a window quality value based upon an actual mobile station position measurement comparison and a window quality value based upon a hypothetical mobile station position measurement comparison.

13. The method of claim 12 further comprising determining ranging error based upon the difference between the two window quality values.

14. The method of claim 2 further comprising recording an outcome based upon the comparison.

15. The method of claim 14 further comprising adjusting source data used in the generation of acquisition assistance windows.

16. The method of claim 2 wherein providing mobile station position measurement data and comparing mobile station position measurement data to an acquisition assistance window is performed on a basis selected from the group consisting of a measurement-by-measurement basis, a sector basis, a grouping of sectors basis, a communication system basis, and a geographic region basis.

17. The method of claim 16 further comprising evaluating acquisition assistance window data on a basis selected from the group consisting of a sector basis, a grouping of sectors basis, a communication system basis, and a geographic region basis, according to the comparing step.

18. The method of claim 16 further comprising adjusting source data used in generating acquisition assistance windows on a basis selected from the group consisting of a measurement-by-measurement basis, a sector basis, a grouping of sectors basis, a communication system basis, and a geographic region basis.

19. The method of claim 2 further comprising determining uncertainty associated with hypothetical position measurement data.

20. The method of claim 19 further comprising determining a range of window quality values based upon the comparison step and uncertainty associated with hypothetical position measurement data.

21. The method of claim 20 further comprising recording a range of window quality values.

22. The method of claim 20 further comprising recording an outcome based upon a comparison.

23. The method of claim 22 further comprising adjusting source data used in generating acquisition assistance windows.

24. The method of claim 23 wherein adjusting source data used in generating acquisition assistance windows is performed on a basis selected from the group consisting of a measurement-by-measurement basis, a sector basis, a grouping of sectors basis, a communication system basis, and a geographic region basis.

25. A system for evaluating acquisition assistance window quality of an assisted position location system, comprising:
    a position determination module comprising an almanac used in the generation of signal acquisition assistance data; and
    a computer for managing and updating the position determination module almanac according to a posteriori knowledge of mobile station measurements and position information.

26. The system of claim 25 wherein the computer comprises a computer readable medium for recordation of acquisition assistance window quality values based upon comparisons of mobile station position measurement data to acquisition assistance windows.

27. The system of claim 25 wherein the computer comprises a computer readable medium for recordation of mobile station receiver successfull and failed signal acquisitions within and outside of acquisition assistance windows.

28. A method of evaluating acquisition assistance window quality for an assisted position location system, the method comprising:
    comparing a posteriori mobile station position measurement data to a positioning signal acquisition assistance window;
    evaluating acquisition assistance window quality based on the comparison; and recording an outcome based upon the comparison.

29. The method of claim 28 wherein recording an outcome based upon the comparison comprises recording the success or failure of signal acquisition by the mobile station receiver within or outside the acquisition assistance window.

30. The method of claim 28 wherein recording an outcome based upon the comparison comprises generating an acquisition assistance window quality value based upon the comparison.

31. The method of claim 28 further comprising adjusting the generation of future acquisition assistance windows based upon the comparison.

* * * * *